United States Patent
King et al.

(10) Patent No.: US 11,754,490 B2
(45) Date of Patent: Sep. 12, 2023

(54) SYSTEM AND METHOD FOR SENSING CORROSION IN AN ENCLOSURE OF AN INFORMATION HANDLING SYSTEM

(71) Applicant: DELL PRODUCTS, LP, Round Rock, TX (US)

(72) Inventors: Joseph Danny King, Georgetown, TX (US); Wade Andrew Butcher, Cedar Park, TX (US); Sandor Farkas, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 777 days.

(21) Appl. No.: 16/562,187

(22) Filed: Sep. 5, 2019

(65) Prior Publication Data

US 2021/0072145 A1 Mar. 11, 2021

(51) Int. Cl.
*G01N 17/04* (2006.01)
*G01N 17/00* (2006.01)
*G06F 13/20* (2006.01)

(52) U.S. Cl.
CPC .......... *G01N 17/04* (2013.01); *G01N 17/006* (2013.01); *G06F 13/20* (2013.01)

(58) Field of Classification Search
CPC ...... G01N 17/006; G01N 17/02; G01N 17/04; G01N 17/043; G01N 17/00; G01N 27/02; G01N 27/04

See application file for complete search history.

(56) References Cited

U.S. PATENT DOCUMENTS

| | | | | |
|---|---|---|---|---|
| 3,852,727 A | * | 12/1974 | Chacon | H04L 12/423 340/517 |
| 5,356,521 A | * | 10/1994 | Nekoksa | G01N 17/02 205/777 |
| 6,539,511 B1 | * | 3/2003 | Hashizume | G01R 31/3004 714/726 |
| 9,182,436 B1 | * | 11/2015 | Robinson | G01R 31/00 |
| 9,291,543 B1 | * | 3/2016 | Robinson | G01N 17/006 |
| 9,945,576 B2 | | 4/2018 | Lovicott et al. | |
| 2005/0029096 A1 | * | 2/2005 | Maurer | H01H 1/605 204/402 |
| 2005/0263395 A1 | * | 12/2005 | Nielsen | G01B 7/06 204/408 |
| 2005/0269213 A1 | * | 12/2005 | Steimle | G01N 17/04 205/775.5 |
| 2012/0038377 A1 | * | 2/2012 | Hamann | G01N 27/00 324/700 |

(Continued)

FOREIGN PATENT DOCUMENTS

WO WO-9107713 A1 * 5/1991 ............... G05F 1/46
WO WO-2009056506 A1 * 5/2009 ........... G01L 1/2243

OTHER PUBLICATIONS

Machine translation for Chemisky et al. WO 2009/056506 (Year: 2009).*

*Primary Examiner* — Steven L Yeninas
(74) *Attorney, Agent, or Firm* — Larson Newman, LLP (57) ABSTRACT

An information handling system includes first and second lines of a differential pair. A baseboard management controller (BMC) periodically determines a resistance of the first line and a resistance of the second line. If the first resistance is substantially equal to the second resistance, then the BMC provides a corrosion signal to a remote diagnostic system.

20 Claims, 6 Drawing Sheets

(56) References Cited

U.S. PATENT DOCUMENTS

| | | | | |
|---|---|---|---|---|
| 2016/0356698 A1* | 12/2016 | Chou | ............. | G01N 17/04 |
| 2018/0003615 A1* | 1/2018 | Kessler | ............. | G01N 27/04 |
| 2018/0284011 A1* | 10/2018 | Farkas | ............. | G01R 17/02 |
| 2019/0166724 A1 | 5/2019 | Moss et al. | | |
| 2019/0204365 A1* | 7/2019 | Bertin | ............. | G01L 27/007 |
| 2020/0326292 A1* | 10/2020 | Xu | ............. | G01R 1/203 |
| 2021/0025764 A1* | 1/2021 | Chehlarov | ............. | G01K 1/08 |
| 2021/0199562 A1* | 7/2021 | Kimura | ............. | G01N 27/125 |

* cited by examiner

SYSTEM AND METHOD FOR SENSING CORROSION IN AN ENCLOSURE OF AN INFORMATION HANDLING SYSTEM

FIELD OF THE DISCLOSURE

The present disclosure generally relates to information handling systems, and more particularly relates to a system to sense corrosion in an enclosure of an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements may vary between different applications. Thus information handling systems may also vary regarding what information is handled, how the information is handled, how much information is processed, stored, or communicated, and how quickly and efficiently the information may be processed, stored, or communicated. The variations in information handling systems allow information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, graphics interface systems, data storage systems, networking systems, and mobile communication systems. Information handling systems may also implement various virtualized architectures. Data and voice communications among information handling systems may be via networks that are wired, wireless, or some combination.

SUMMARY

An information handling system includes a differential pair with first and second lines. If the resistance in the lines is substantially equal, then the BMC may provides a corrosion signal to a remote diagnostic system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
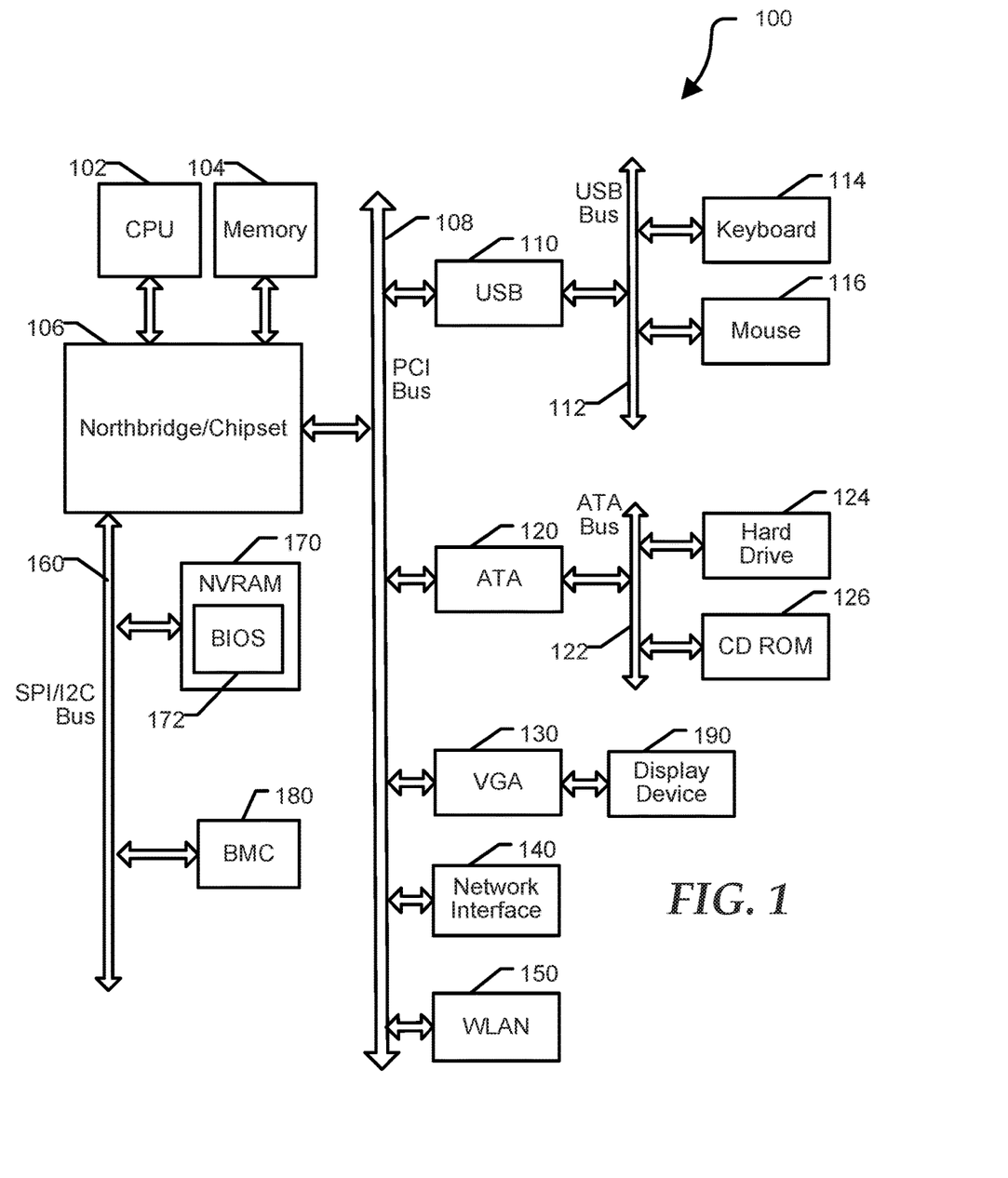
FIG. 1 is a block diagram of a general information handling system according to at least one embodiment of the disclosure.

FIG. 1 illustrates a general information handling system 100 including a processor 102, a memory 104, a northbridge/chipset 106, a PCI bus 108, a universal serial bus (USB) controller 110, a USB bus 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an embodiment, information handling system 100 may be information handling system 200 of FIG. 2. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of ordinary skilled in the art will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 190 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
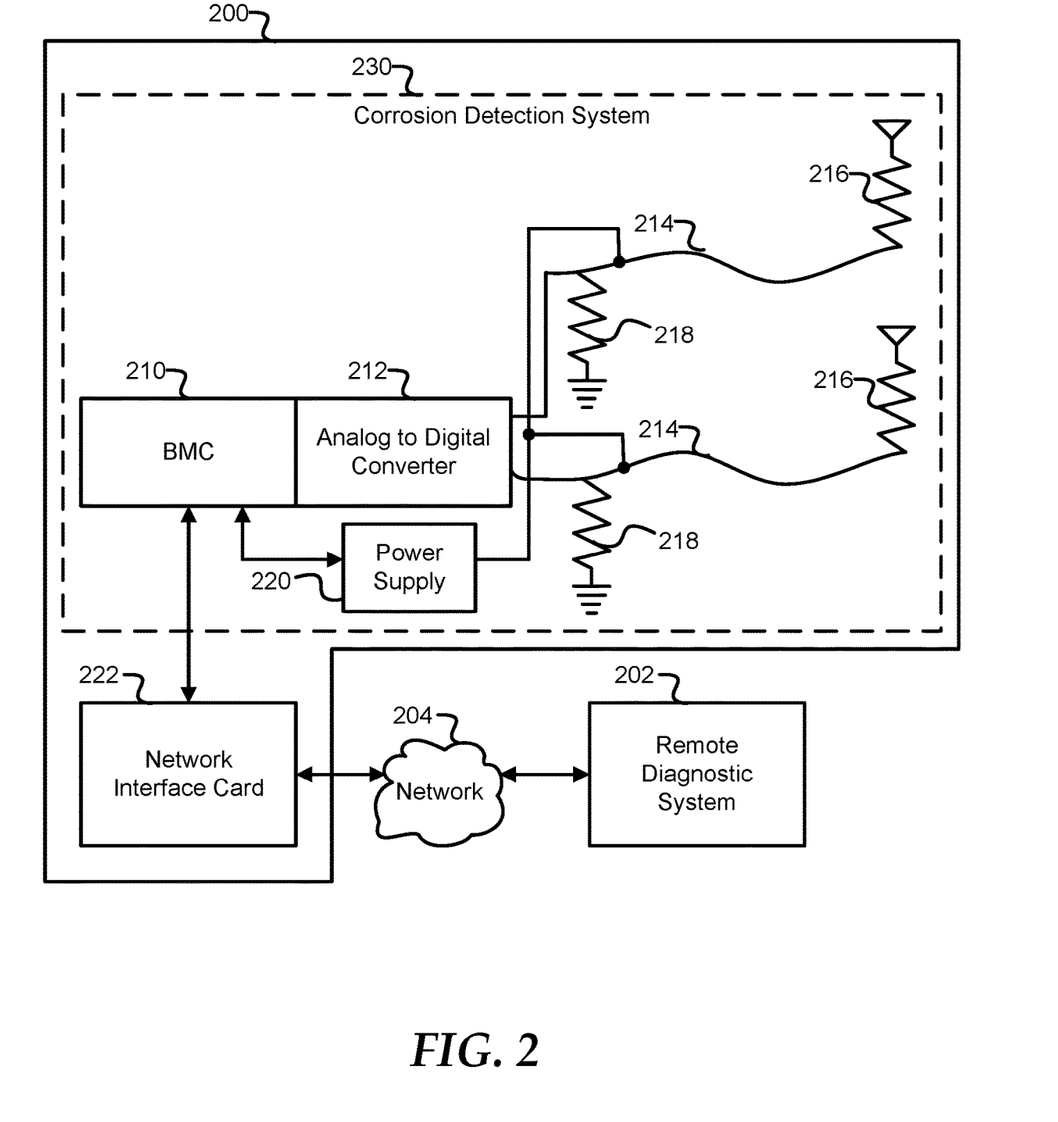
FIG. 2 is a block diagram of a portion of an information handling system according to at least one embodiment of the disclosure.
Figure 3:
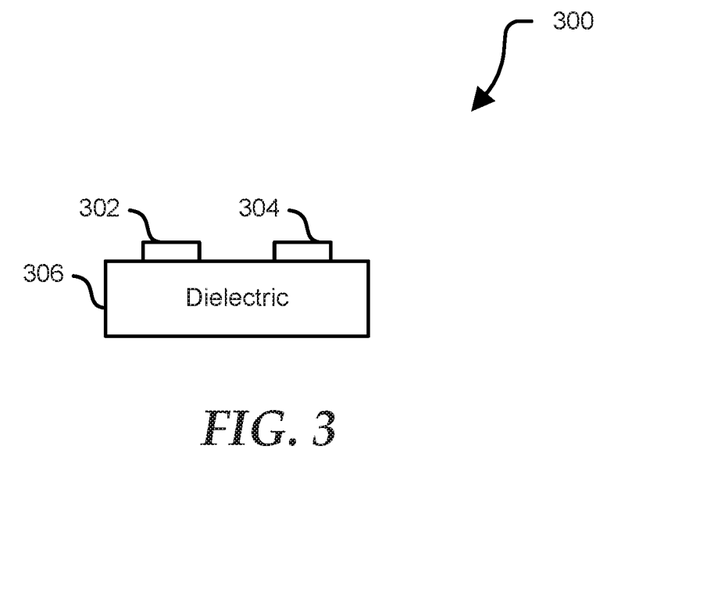
FIG. 3 is a diagram of an embodiment of a differential pair for use within the information handling system of FIG. 2 according to at least one embodiment of the disclosure.
Figure 4:
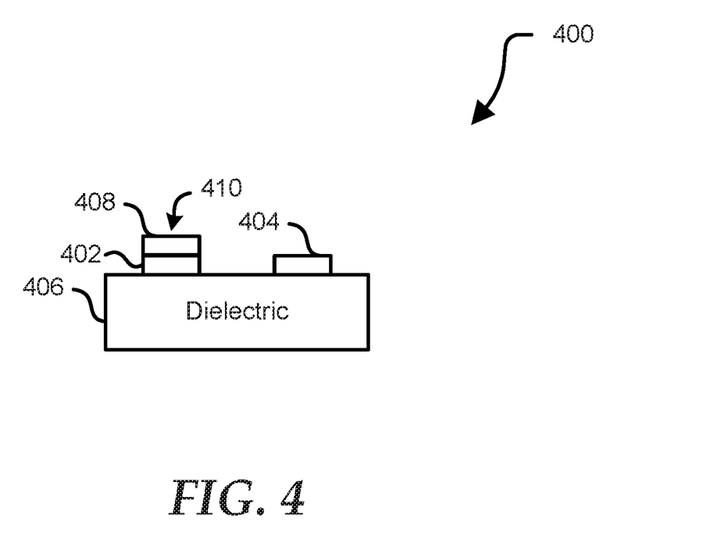
FIG. 4 is a diagram of an embodiment of another differential pair for use within the information handling system of FIG. 2 according to at least one embodiment of the disclosure.

FIG. 2 is a block diagram of a portion of an information handling system 200 in communication with a remote diagnostic system 202 via a network 204 according to at least one embodiment of the disclosure. Information handling system 200 includes a baseboard management controller (BMC) 210, an analog to digital converter (ADC) 212, a differential pair communication line 214, a pull up resistor 216, a pull down resistor 218, a power supply 220, and a network interface card 222. Information handling system 200 may be employed, in whole or in part, by information handling system 100 illustrated in FIG. 1, or any other system, device, component, etc. operable to employ portions, or all of, the information handling system. In an example, BMC 210 may be any suitable type of controller, such as a BMC in accordance with an IPMI specification, an Integrated Dell Remote Access Controller (iDRAC), or the like. In an example, differential pair communication line 214 may be any suitable differential pair including, but not limited to, a pair of traces routed on a printed circuit board (PCB), as shown in FIGS. 3 and 4, or two metal wires braided to form a cable. In an embodiment, a corrosion detection system 230 is implemented by the combination of BMC 210, ADC 212, differential pair 214, resistors 216 and 218, and power supply 224. Information handling system 200 may include additional components (not shown in FIG. 2), without varying from the scope of this disclosure. Furthermore, a skilled practitioner will recognize that "differential pair" in this context is not being used in the typical sense, as it would for a transmission line or communication link in which noise received by both lines cancels. Instead, the differential pair in 214 is merely a pair of wires with different attributes affecting corrosion, and pullup resistor 216 and pulldown resistor 218 would need to be duplicated to measure the resistance of the lines independently.

Information handling system 200 may be any suitable system, such as a server, and may include an enclosure around the components of the information handling system as shown by the outline in FIG. 2. In an example, information handling system 200 may be located in any area around the world and may be exposed to different environmental conditions based on a particular area. In an example, the environmental conditions may cause different degrees of corrosion within information handling system 200. For example, in an area with high levels of pollution, a toxic industrial environment, or the like, components within information handling system 200 may corrode at a faster rate than the same components in areas with better environmental conditions. Thus, corrosion detection system 230 may improve information handling system 200 by sensing early corrosion on components with the information handling system in response to detecting corrosion on differential pair 214. Corrosion detection system 230 may enable a notification to be provided to a technician to replace components, such as PCBs and cables, within information handling system 200 prior to the corrosion on the components being too high to cause damage to the information handling system.

Operation of corrosion detection system 230 within information handling system 200 will be described with respect to FIGS. 2, 3, and 4. Referring now to FIG. 3, a differential pair 300 may be formed by routing traces 302 and 304 on dielectric 306. In certain examples, different pair 300 may be differential pair 214 of FIG. 2. In an example, traces 302 and 304 may be formed from any suitable metal including, but not limited to, copper. In this example, both of the traces may be formed from the same metal, and also have the same resistance.

Referring back to FIG. 2, BMC 210 and ADC 212 may combine to measure/calculate the resistances of the traces, such as traces 302 and 304, of differential pair 214 in any suitable manner. For example, ADC 212 may measure a voltage drop along traces 302 and 304 while a current is being provided to the differential pair 214. Based on the current provided through differential pair 214 and the measured voltage drop in traces 302 and 304, BMC 210 may calculate the resistance of each trace using any suitable manner including, but not limited to, calculating the resistance using Ohm's Law. In response to calculating the resistances, BMC 210 may store the resistance values in a computer memory, such as memory 170 of FIG. 1.

During a corrosion detection operation, BMC 210 may perform one or more operations to determine whether to indicate a corrosion prediction for components of information handling system 200. In an example, based on traces 302 and 304 being the same metal, BMC may control a device, such as a power supply 220, to provide a voltage across differential pair 214. Based on the polarity of the voltage provided across different pair 214, one of the traces will act as an anode and the other trace will act as a cathode. For example, as the voltage is applied across different pair 214, such as traces 302 and 304, ions may move or migrate from the anode trace to the cathode trace. In an example, if moisture is present within the enclosure of information handling system 200, the voltage will start an electrolytic process to move ions, such as copper ions, from the anode trace to the cathode trace. In certain examples, the more corrosive the environment around information handling system 200, the more active the electrolyte process will be when the voltage is applied across differential pair 214, such as traces 302 and 304. In an embodiment, the voltage applied across differential pair 214 is kept below a particular voltage level, such as 1.3V, to prevent electrolysis of pure water coming from humidity and moisture that may be in the enclosure of information handling system 200. In an example, the voltage applied across differential pair 214 may cause the ions to move from a first trace, such as trace 304, to a second trace, such as trace 302. In an embodiment, the movement of ions from trace 304 to trace 302 raises the resistance of trace 304 based on the loss of ions within the trace.

BMC 210 may perform one or more operations to detect whether corrosion is predicted within information handling system 200. In an example, BMC 210 may cause power supply 220 to provide the voltage across differential pair 214 for a particular amount of time. At the end of that time, BMC 210 may cause power supply 220 to remove the voltage. In response to the voltage across differential pair 214 being removed, ADC 212 may measure the voltage drop along the traces and provide the voltage drop values to BMC 210. BMC 210 may then calculate and compare the resistances of the traces in differential pair 214. If the resistances differ by more than a threshold amount, BMC 210 may determine that a corrosion event is imminent and provide a corrosion prediction signal to remote diagnostic system 202 via network interface card 222 and network 204. In response to receiving the corrosion prediction signal, remote diagnostic system 202 notify an individual that a technician should be sent to information handling system 200 to clean or replace the components within the information handling system and prevent the corrosion of the components from damaging the information handling system. In an example, these operations may be periodically repeated by BMC 210 to enable corrosion detection system 230 to continuously monitor for possible corrosion within information handling system 200.

FIG. 4 is a diagram of a differential pair 400 for use within information handling system 200 of FIG. 2 according to at least one embodiment of the disclosure. In certain examples, different pair 400 may be differential pair 214 of FIG. 2. Differential pair 400 may be formed by routing traces 402 and 404 on dielectric 406. In an example, traces 402 and 404 may be formed from any suitable metal including, but not limited to, copper. In this example, both of the traces may be the same metal, but trace 402 may be plated with another metal 408 to form a plated trace 410. Based on plating 408 over trace 402 forming plated trace 410, traces 404 and 410 may be considered to be formed from dissimilar metals, such that the traces may have different resistances. In an example, the plating 408 may preferably be a metal that has a more negative anodic index than the metal of trace 402 and that has a high electrical conductivity. For example, if the metal of traces 402 and 404 is copper, the metal of plating 408 may be tin, zinc, magnesium, or the like.

Referring back to FIG. 2, ADC 212 may measure a voltage drop along traces 404 and 410 and BMC 210 may calculate the resistances of the traces in any suitable manner including, but not limited to, the manner described above with respect to traces 302 and 304. In response to calculating the resistances of traces 410 and 404, BMC 210 may store the resistance values in a computer memory, such as memory 170 of FIG. 1. In an example, trace 410 (combination of trace 402 and plating 408) may have a lower resistance than trace 404.

In an example, based on plating 408 having a more negative anodic index than traces 402 and 404, the metal of the plating may deplete more quickly than the metal of the traces when information handling system 200 is placed within a corrosive environment. In response to an electrolyte process caused by the corrosive environment, ions from plating 408 may migrate from trace 410 to trace 404. In an example, the more corrosive the environment around and within the enclosure of information handling system 200, the more active the electrolyte process to move ions from plating 408 to trace 404. In an embodiment, the movement of ions from plating 408 to trace 404 raises the resistance of trace 410, such that the resistances of traces 410 and 404 will approach each other.

During a corrosion detection operation of corrosion detection system 230, BMC 210 and ADC 212 may perform one or more operations to determine whether to indicate a corrosion prediction for components of information handling system 200. For example, ADC 212 may periodically measure the voltage drop of traces 410 and 404 and provide the voltage drop values to BMC 210. BMC 210 may then calculate and compare the resistances of the traces, such as traces 410 and 404, in differential pair 214. If the difference between the resistances is within a threshold value, BMC 210 may determine that corrosion event is imminent and provide a corrosion prediction signal to remote diagnostic system 202 via network interface card 222 and network 204. In response to receiving the corrosion prediction signal, remote diagnostic system 202 notify an individual that a technician should be sent to information handling system 200 to replace the components within the information handling system and prevent the corrosion of the components from damaging the information handling system. In an example, these operations may be periodically repeated by BMC 210 and ADC 212 to enable corrosion detection system 230 to monitor for possible corrosion within information handling system 200.

In an additional or alternative example, differential pair 214, formed from traces 410 and 404, may be replaced with a braided cable with two or more strands formed from dissimilar metals. For example, the cable may initially have a resistance of one value when information handling system 100 is new, and over time, the resistance may drift because of cable corrosion accelerated by electrolysis between the two metals. If a difference between the initial resistance and the current resistance exceeds a threshold value, BMC 210 may determine that corrosion event is imminent and provide a corrosion prediction signal to remote diagnostic system 202 as described above.

Figure 5:
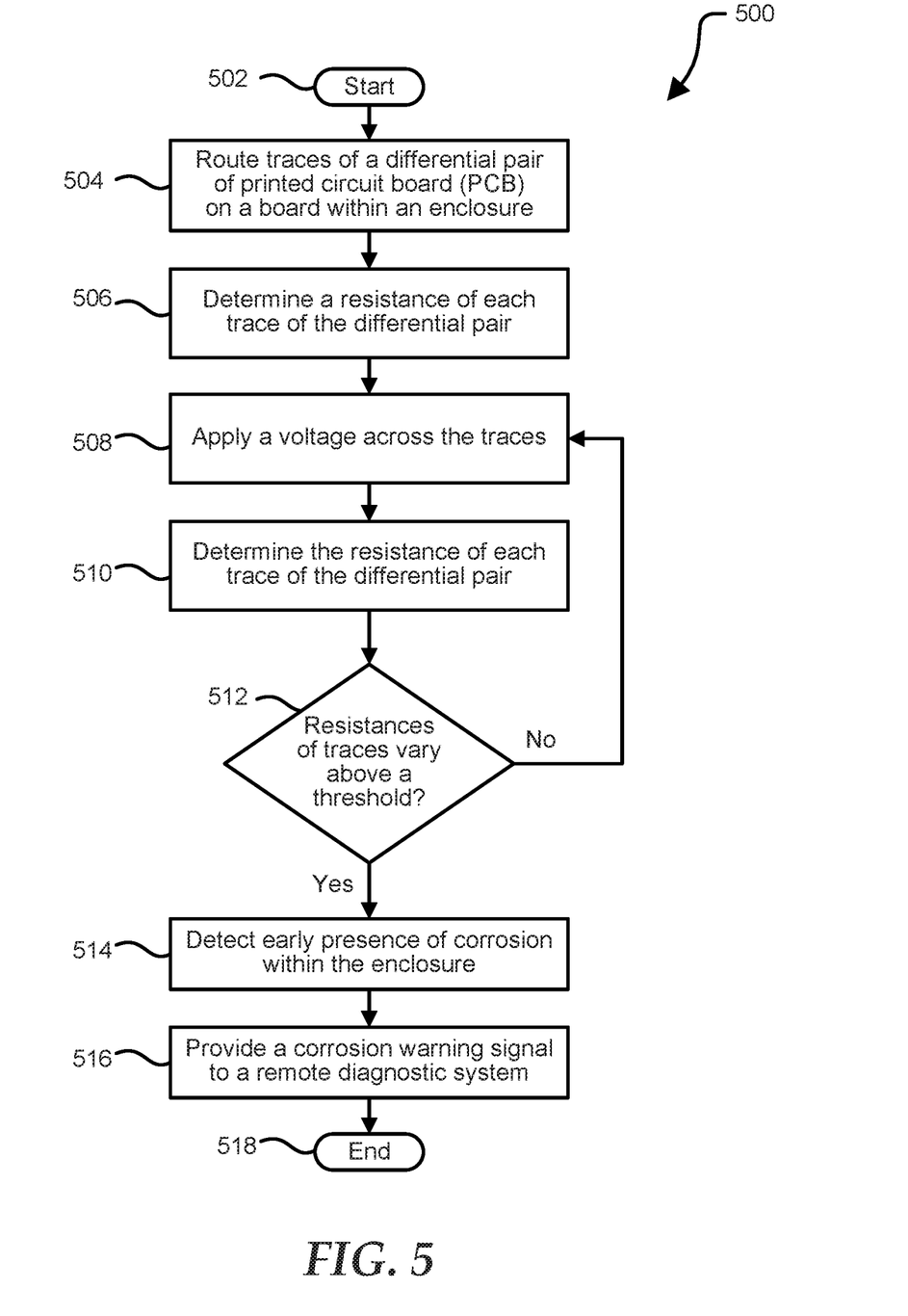
FIG. 5 is a flow diagram illustrating a method for sensing corrosion within an enclosure of an information handling system according to at least one embodiment of the disclosure.

FIG. 5 is a flow diagram illustrating a method 500 for sensing corrosion within an information handling system, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 5.

At block 504, traces of a differential pair of printed circuit board (PCB) are routed on a board within an enclosure. In certain examples, both of the traces may be formed from the same metal. In an example, the enclosure may be associated with any suitable information handling system including, but not limited to, a server. In certain examples, the enclosure may be place in an area with any suitable conditions that may cause accelerated corrosion on electronic components within the enclosure including, but not limited to, traces and vias on the PCB. In an example, the suitable conditions may include, but are not limited to, high degrees of pollution and in toxic industrial environments.

At block 506, a resistance of each trace of the differential pair is determined. In an example, the resistances may be determined by an analog to digital converter measuring a voltage drop along the traces, a BMC calculating the resistances of the traces based on the measured voltage drop. In certain examples, the resistances of the traces may start as being substantially equal. At block 508, a voltage is applied across the traces. In an embodiment, the voltage applied across the traces is below a voltage level, such at 1.3V, at which electrolysis of pure water happens. In an example, the voltage applied across the traces may cause an electrolytic process to start in the presence of moisture within the enclosure. For example, the voltage applied across the traces may cause ions to move from a first trace to a second trace. In an example, the more corrosive an environment within the enclosure, the more active the electrolyte process.

At block 510, the resistance of each trace is determined. At block 512, a determination is made whether the resistances of the traces vary by an amount above a threshold. In an example, corrosion created by the electrolytic process may raise the resistance of the second trace. If the resistances of the traces do not vary by the amount above the threshold, the flow continues as stated above at block 508. If the resistances of the traces do vary by the amount above the threshold, an early presence of corrosion is detected within the enclosure at block 514. At block 516, a corrosion warning signal is provided to a remote diagnostic system and the method ends at block 518.

Figure 6:
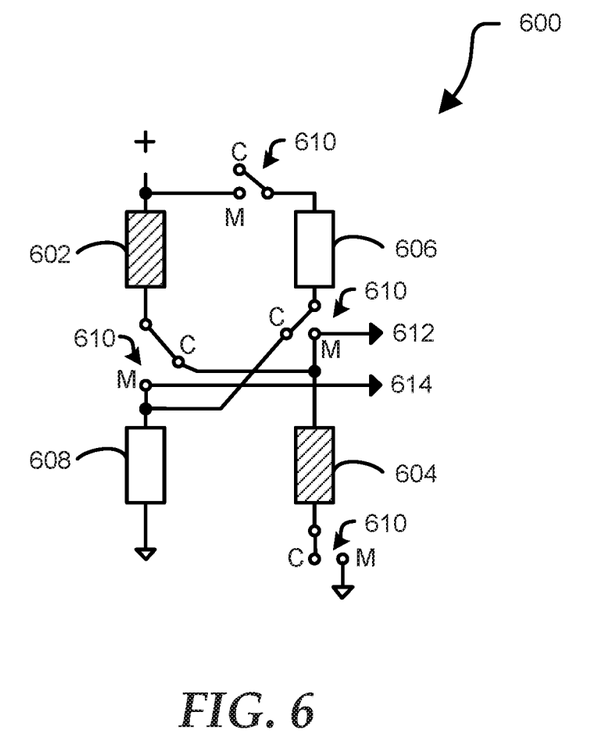
FIG. 6 is a diagram of circuitry utilized to implement the method of FIG. 5.

FIG. 6 illustrates an exemplary circuitry 600 to implement method 500. In an example, circuitry 600 may include a first trace represented by resistances 602 and 604 and a second trace represented by resistances 606 and 608. The first and second traces may begin with roughly equal resistances. In an example, the metal of the first trace, represented by resistances 602 and 604, may be different from the meal of the second trace, represented by resistances 606 and 606. Circuity 600 also includes switches 610 that may be utilized to apply a voltage across the traces when the circuitry in in a measurement mode. Switches 610 may include a first terminal, labeled C, and a second terminal, labeled M.

To measure corrosion, switches 610 may be reconfigured to allow measurement of the trace resistance in a Wheatstone bridge topology. For example, switches 610 may change from a first configuration, such as the switches being connected to the 'C' terminal, to a second configuration, such as the switches being connected to the 'M' terminal, to enable the voltage to the applied to the traces and the trace resistances to be measured. In an example, the trace resistances may be measured based on voltages across nodes 612 and 614. In an embodiment, the voltage across nodes of measurement 612 and 614 will increase as the corroded trace resistance increases. Thus, an increase in the measured voltage across nodes 612 and 614 indicates an increase in corrosion within the traces.

Figure 7:
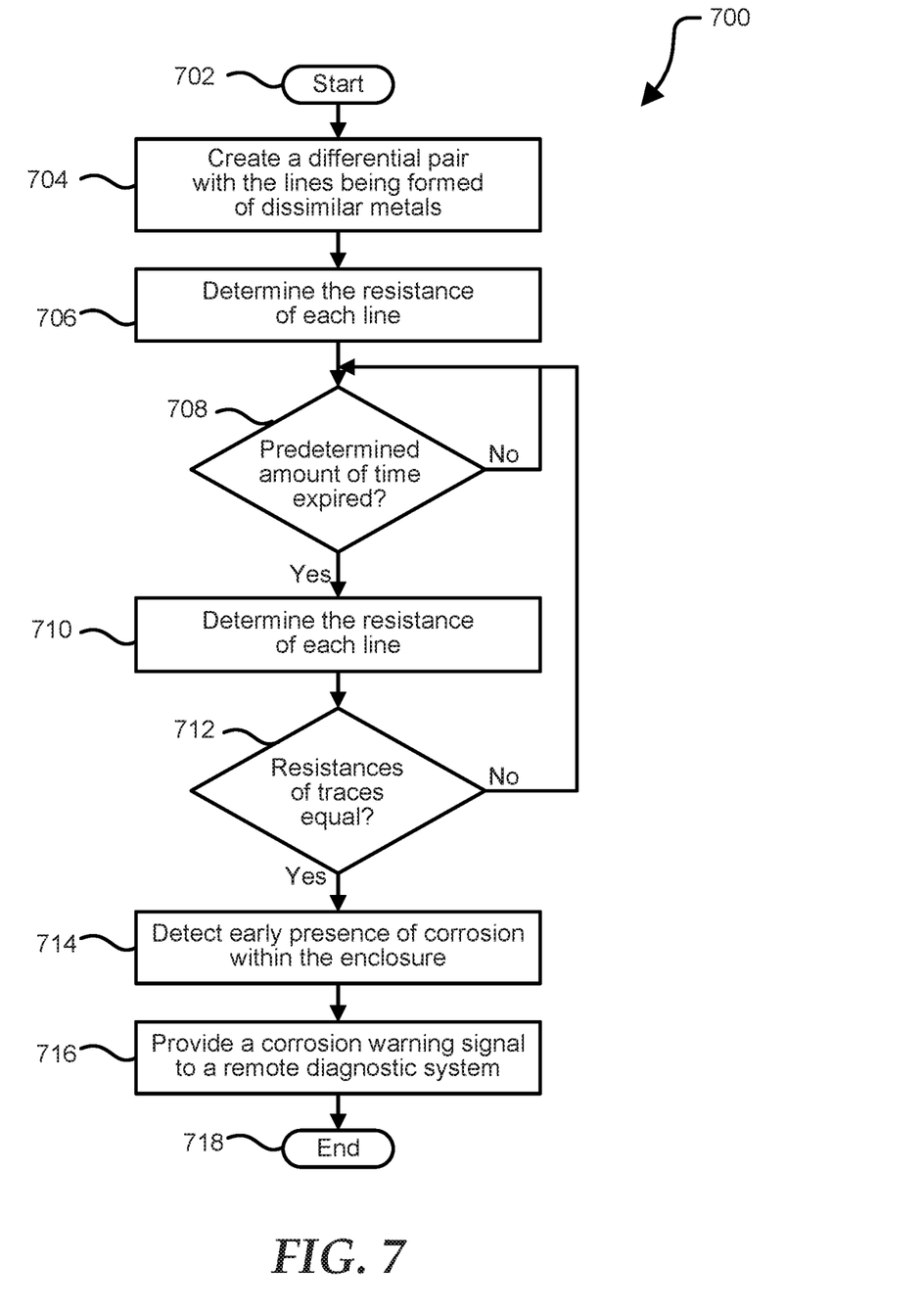
FIG. 7 is a flow diagram illustrating another method for sensing corrosion within an enclosure of an information handling system according to at least one embodiment of the disclosure.

FIG. 7 is a flow diagram illustrating a method 700 for sensing corrosion within an information handling system, starting at block 702. It will be readily appreciated that not every method step set forth in this flow diagram is always necessary, and that certain steps of the methods may be combined, performed simultaneously, in a different order, or perhaps omitted, without varying from the scope of the disclosure. FIG. 7 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 7.

At block 704, a differential pair is created with the line of the differential pair being formed from dissimilar metals. In an example, the differential pair may be created from two traces routed on a printed circuit board (PCB) within an enclosure. In this example, a first trace is formed by routing a first metal on the PCB and another metal is plated on top of the first metal, and the second trace is formed just by routing the first metal on the PCB. In an example, the different metal plated on the first trace may be any suitable metal that may reduce the resistance of the trace and that has a high electrical conductivity, such that corrosion between the traces may cause ions of the different metal to migrate to the other trace. In an example, the differential pair may be created from two wires of dissimilar wires being braided together to form a braided cable. In an example, the enclosure may be associated with any suitable information handling system including, but not limited to, a server. In certain examples, the enclosure may be place in an area with any suitable conditions that may cause accelerated corrosion to electronic components within the enclosure including, but not limited to, traces and vias on a PCB. In an example, the suitable conditions may include, but are not limited to, high degrees of pollution and in toxic industrial environments.

At block 706, a resistance of each line of the differential pair is determined. In an example, the resistances may be determined by an analog to digital converter measuring a voltage drop along the traces, a BMC calculating the resistances of the traces based on the measured voltage drop. In certain examples, the resistance of one line may start lower than the resistance of the other line. At block 708, a determination is made whether a predetermined amount of time has expired.

In response to the predetermined amount of time expiring, the resistance of each line is determined at block 710. In an embodiment, corrosion in between the lines may cause ions of the first line to migrate to the second line. In response to the migration of ions, the resistance of the first line may increase and approach the resistance of the second line. At block 712, a determination is made whether the resistances of the lines are equal. If the resistances of the lines are not equal, the flow continues as stated above at block 708. If the resistances of the lines are equal, an early presence of corrosion is detected within the enclosure at block 714. At block 716, a corrosion warning signal is provided to a remote diagnostic system and the method ends at block 718.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module may include software, including firmware embedded at a processor or software capable of operating a relevant environment of the information handling system. The device or module may also include a combination of the foregoing examples of hardware or software. Note that an information handling system may include an integrated circuit or a board-level product having portions thereof that may also be any combination of hardware and software.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
a power supply including an output to provide a voltage;
first and second lines of a differential pair, wherein a first end of the first line is coupled to a first pull up resistor, a first end of the second line is coupled to a second pull up resistor, a second end of the first line is coupled to a first pull down resistor and to the output, and a second end of the second line is coupled to a second pull down resistor and to the output, wherein the first line acts as an anode and the second line acts as a cathode; and a baseboard management controller (BMC) coupled to the first and second lines, the BMC to:
apply a voltage from the power supply across the first and second lines for a predetermined amount of time;
in response to an expiration of the predetermined amount of time, remove the voltage from the first and second lines;
determine a first resistance of the first line and a second resistance of the second line;
determine whether the first resistance varies from the second resistance by more than a threshold amount;
in response to the first resistance varying from the second resistance by more than the threshold amount, detect corrosion within an enclosure of the information handling system; and
provide a corrosion warning signal to a remote diagnostic system, wherein the corrosion warning signal indicates corrosion within the enclosure.

2. The information handling system of claim 1, further comprising:
an analog to digital converter (ADC) coupled to the BMC and the first and second lines, the ADC to periodically measure a first voltage drop along the first line and a second voltage drop along the second line, wherein the first resistance is determined based on the first voltage drop and the second resistance is determined based on the second voltage drop.

3. The information handling system of claim 1, wherein the first line is a first trace and the second line is a second trace on a printed circuit board (PCB) of the information handling system.

4. The information handling system of claim 3, wherein the first trace includes a first metal portion and a second metal portion plated on top of the first metal portion, and the second trace includes a third metal portion.

5. The information handling system of claim 4, wherein the first metal portion and the third metal portion are formed from a first type of metal, and the second metal portion is formed from a second type of metal.

6. The information handling system of claim 5, wherein the second type of metal is more negative on an anodic index than the first type of metal.

7. The information handling system of claim 4, wherein the first line initially has a lower resistance than the second line based on the second metal portion being plated on top of the first metal portion.

8. The information handling system of claim 1, wherein a corrosive environment within the information handling system causes ions to migrate from the first line to the second line.

9. The information handling system of claim 1, wherein the differential pair is formed by the first and second lines being braided in a cable.

10. A method, comprising:
coupling a first end of a first line of a differential pair of an information handling system to a first pull up resistor, the first line acting as a cathode;
coupling a first end of a second line of the differential pair to a second pull up resistor, the second line acting as an anode;
coupling a second end of the first line to a first pull down resistor and to an output of a power supply of the information handling system;
coupling a second end of the second line to a second pull down resistor and to the output;
applying a voltage from a power supply across the first and second lines for a predetermined amount of time;
in response to an expiration of the predetermined amount of time, removing the voltage from the first and second lines;
determining, by a baseboard management controller, a first resistance of the first line and a second resistance of the second line;
determining whether the first resistance varies from the second resistance by more than a threshold amount; and
if the first resistance varies from the second resistance by more than the threshold amount, then generating a signal that indicates the presence of corrosion.

11. The method of claim 10, further comprising:
periodically measuring, by an analog to digital converter (ADC), a first voltage drop along the first line and a second voltage drop along the second line, wherein the determining of the first resistance is based on the first voltage drop and the determining of the second resistance is based on the second voltage drop.

12. The method of claim 10, further comprising:
routing a first trace on a printed circuit board (PCB) of the information handling system to create the first line, wherein the first trace is a first type of metal; and
routing a second trace on the PCB of the information handling system to create the second line, wherein the second trace is the first type of metal.

13. The method of claim 12, further comprising:
plating the first trace with a second type of metal.

14. The method of claim 13, wherein the first line initially has a lower resistance than the second line based on the second metal portion being plated on top of the first metal portion.

15. The method of claim 10, wherein the differential pair is formed by the first and second lines being braided in a cable.

16. A method, comprising:
coupling a first end of a first trace of a differential pair of an information handling system to a first pull up resistor, the first trace acting as a cathode;
coupling a first end of a second trace of the differential pair to a second pull up resistor, wherein the first and second traces include a same metal, the second trace acting as an anode, wherein the first and second traces are on a printed circuit board (PCB) of an information handling system;
coupling a second end of the first trace to a first pull down resistor and to an output of a power supply of the information handling system;
coupling a second end of the second trace to a second pull down resistor and to the output;
applying, by a voltage supply, a voltage across the first and second traces for a predetermined amount of time;
in response to an expiration of the predetermine amount of time, removing the voltage from the first and second traces;
determining a first resistance of the first trace and a second resistance of the second trace;
determining, by a baseboard management controller (BMC), whether the first resistance varies from the second resistance by more than a threshold amount;
in response to the first resistance varying from the second resistance by more than the threshold amount, detecting, by the BMC, an early presence of corrosion within an enclosure of the information handling system; and
providing, by the BMC, a corrosion warning signal to a remote diagnostic system, wherein the corrosion warning signal indicates the early presence of corrosion within the enclosure.

17. The method of claim 16, further comprising:
in response to an expiration of the predetermine amount of time, measuring, by an analog to digital converter (ADC), a first voltage drop along the first trace and a second voltage drop along the second trace, wherein the determining of the first resistance is based on the first voltage drop and the determining of the second resistance is based on the second voltage drop.

18. The method of claim 16, further comprising:
causing an electrolytic process to start between the first and second traces based on the voltage and presence of moisture on the PCB.

19. The method of claim 16, further comprising:
preventing electrolysis of pure water on the PCB based on the voltage being below a predetermined threshold.

20. The method of claim 16, further comprising:
prior to determining the first resistance and the second resistance, removing the voltage from across the first and second traces.

* * * * *